United States Patent [19]
Waite

[11] Patent Number: 4,882,046
[45] Date of Patent: Nov. 21, 1989

[54] MULTI-CHAMBER SEPTIC TANK ASSEMBLY

[75] Inventor: Ian Waite, Avalon Beach, Australia

[73] Assignee: Biocycle Pty. Ltd., Avalon Beach, Australia

[21] Appl. No.: 296,505

[22] Filed: Jan. 12, 1989

[51] Int. Cl.$^4$ .............................................. C02F 3/30
[52] U.S. Cl. .................. 210/195.3; 210/206; 210/207; 210/221.2; 210/525; 210/532.2
[58] Field of Search ................ 210/195.3, 195.4, 205, 210/206, 207, 220, 221.1, 221.2, 524, 525, 532.2

[56] References Cited

U.S. PATENT DOCUMENTS

| | | | |
|---|---|---|---|
| 2,938,630 | 5/1960 | Novak | 210/532.2 |
| 3,031,083 | 4/1962 | Schreiber | 210/532.2 |
| 3,118,835 | 1/1964 | Butler et al. | 210/221.1 |
| 3,228,531 | 1/1966 | Proudman | 210/532.2 |
| 3,741,393 | 6/1973 | Estes et al. | 210/532.2 |
| 3,767,051 | 10/1973 | Thompson | 210/221.1 |
| 3,809,245 | 5/1974 | Kennedy | 210/532.2 |
| 4,122,013 | 10/1978 | Greenleaf, Jr. et al. | 210/195.3 |
| 4,372,856 | 2/1983 | Morrison | 210/195.3 |

Primary Examiner—Richard V. Fisher
Assistant Examiner—Joseph Drodge
Attorney, Agent, or Firm—Ladas & Parry

[57] ABSTRACT

A septic system tank assembly, including a primary outer tank having a cylindrical wall, and within which there is nested a second tank also of a cylindrical configuration, extending diametrically across each tank is a dividing partition dividing the two tanks up into four chambers which carry out anaerobic, aerobic, clarification and disinfection treatment, the assembly further includes an air pump and conduits which delivers air to the aerobic chamber and a dispenser to dispense disinfectant material into the disinfectant chamber. The assembly also includes separate conveyor means to transfer both solid matter and floating matter from the clarification chamber to the anaerobic chamber.

5 Claims, 7 Drawing Sheets

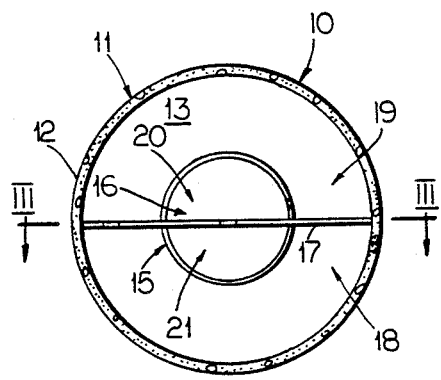
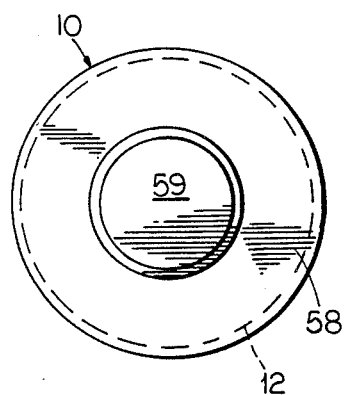
FIG.1  FIG.2
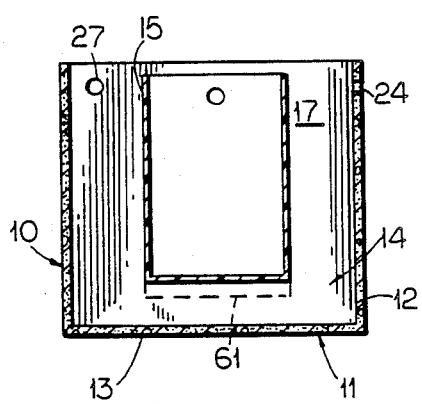
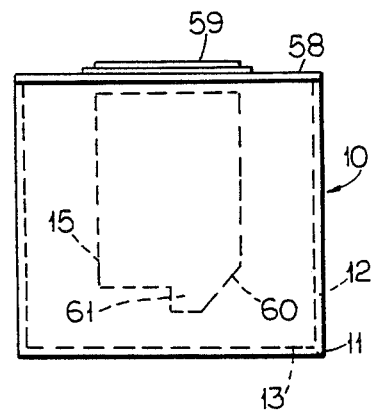
FIG. 3  FIG. 4

4,882,046

MULTI-CHAMBER SEPTIC TANK ASSEMBLY

BACKGROUND OF THE INVENTION

The present invention relates to sewerage septic systems and more particularly but not exclusively to domestic sewerage systems.

PRIOR ART

Known septic systems, particularly domestic septic systems have usually consisted of a single receiving tank into which waste water effluent is delivered, and processed anaerobically for discharge via absorption trenches. A modified form of this type of system included a second holding tank to carry out anaerobic clarification and disinfection treatment. The discharge is then delivered to a suitable irrigation system.

The above discussed anaerobic system suffered from the disadvantage that the discharge has not been aerobically treated and disinfected. Where a second holding tank is provided for the anaerobic clarification and disinfection, two tanks were required adding considerably to the installation and manufacturing costs.

SUMMARY OF THE INVENTION

It is the object of the present invention to overcome or substantially ameliorate the above disadvantages.

There is disclosed herein a septic tank assembly comprising:

a first vessel encompassing a space;

a second vessel nested within said first vessel and co-operating therewith to divide said space into two sub-spaces;

partition means co-operating with the two vessels to divide said sub-spaces into four treatment chambers which are generally vertically coextensive;

an inlet duct communicating with a first one of said chambers to deliver waste water thereto for anaerobic treatment;

a first transfer duct extending from an upper portion of said first chamber to said second chamber where the discharge from said first chamber is aerobically treated;

a second transfer duct extending from an upper portion of said second chamber to said third chamber where the discharge of said second chamber is subjected to a clarification treatment;

a third transfer duct extending from an upper portion of said third chamber to a fourth one of said chambers where the discharge of said third chamber is disinfected;

an outlet duct from said fourth chamber through which treated water exits from within said assembly;

an aeration device including an air pump and conduits to deliver air to a lower portion of said second chamber so that air passes upwardly through liquid contained within said second chamber;

a first conveyor means extending from a lower portion of said third chamber to said first chamber to transfer solid matter from said third chamber to said first chamber;

second conveyor means extending from an upper portion of said third chamber to said first chamber to transfer floating matter from said third chamber to said first chamber; and a sterilizing agent dispenser to deliver a sterilizing agent into said fourth chamber.

BRIEF DESCRIPTION OF THE DRAWINGS

A preferred form of the present invention will now be described by way of example with reference to the accompanying drawings, wherein:

FIG. 1 is a schematic top plan view of a septic tank assembly, with lid removed, providing anaerobic chamber, an aeration chamber, a clarification chamber, and an irrigation holding chamber;

FIG. 2 is a schematic top plan view of the assembly of FIG. 1;

FIG. 3 is a schematic sectioned side elevation through the main vessels of the assembly of FIG. 1;

FIG. 4 is a schematic side elevation of the assembly of FIG. 2;

DESCRIPTION OF THE PREFERRED EMBODIMENT

Figure 5:
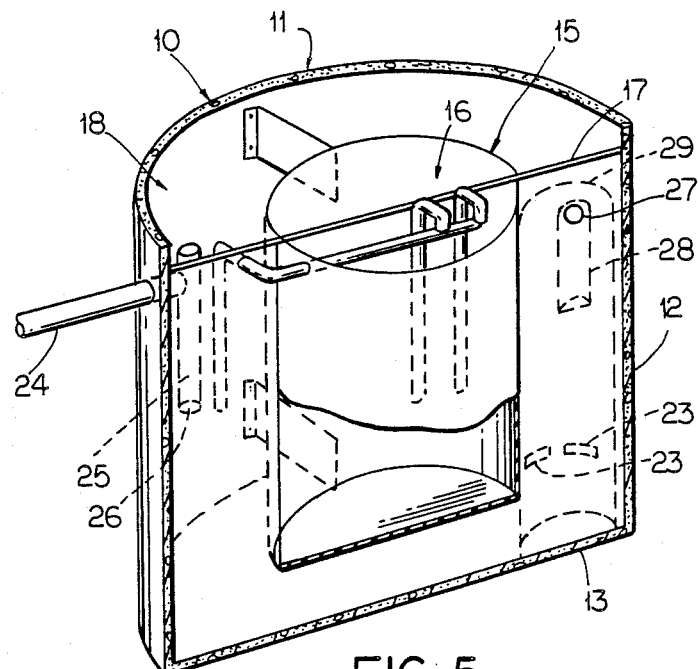
FIG. 5 is a schematic perspective view of the anaerobic chamber of the assembly of FIG. 1.

In the accompanying drawings there is schematically depicted a waste water septic system preferably to be used as a domestic sewerage septic system.

The septic system includes an assembly 10. The assembly 10 has a main outer tank 11 which could be formed of moulded concrete. The tank 11 has a cylindrical side wall 12 and a bottom wall 13 encompassing a space 14. Nested within the tank 11 is a second tank 15 which may be formed of fibre-glass and is also of a cylindrical configuration. The tank 15 encompasses a space 16. Extending diagonally across the tank 11 so as to pass through the tank 15 is a partitioning wall 17. The tank 15 is also provided with a lower inclined wall 60 leading to a trench 61.

The tanks 11 and 15, and wall 17 co-operate to provide four chambers. The first chamber 18 provides a space into which the waste water is delivered to be treated anaerobically. The discharge from chamber 18 is delivered to the second chamber 19 whereat the waste water is subjected to an aeration treatment. The discharge from chamber 19, is delivered to chamber 20 whereat the water undergoes a clarification treatment. The discharge from chamber 20 is delivered to chamber 21, which is an irrigation chamber. Here the water is disinfected. The chambers 18 and 19 co-operate to form a space of annular configuration, which the chambers 20 and 21 co-operate to provide a space of cylindrical space.

The top of the tank 11 is closed by a lid 58 provided with a central inspection aperture, closed by a further lid 59.

Figure 6:
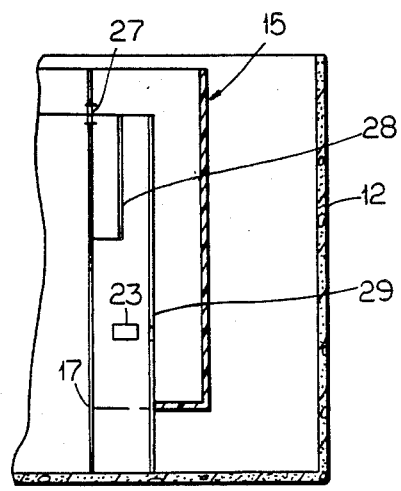
FIG. 6 is a schematic part sectioned side elevation illustrating a baffle employed in the anaerobic chamber of FIG. 3.

In FIGS. 5 and 6 the anaerobic chamber 18 is more fully depicted. The chamber 18 is also provided with an inlet including a first horizontal pipe 24 extending to a vertical pipe 25, which discharges the waste water into the chamber 18 via its lower outlet 26.

Extending through the petition wall 17 is a passage 27. The passage 27 is generally horizontal and receives the discharge from chamber 18 and delivers the discharge to the chamber 19. Surrounding the entrance to the passage 27 is an effluent control semi-circular baffle 28, which is surrounded by a further solid detention baffle 29. The baffle 29 is designed to separate solid matter and to permit water to flow via two rectangle ports 23.

Figure 7:
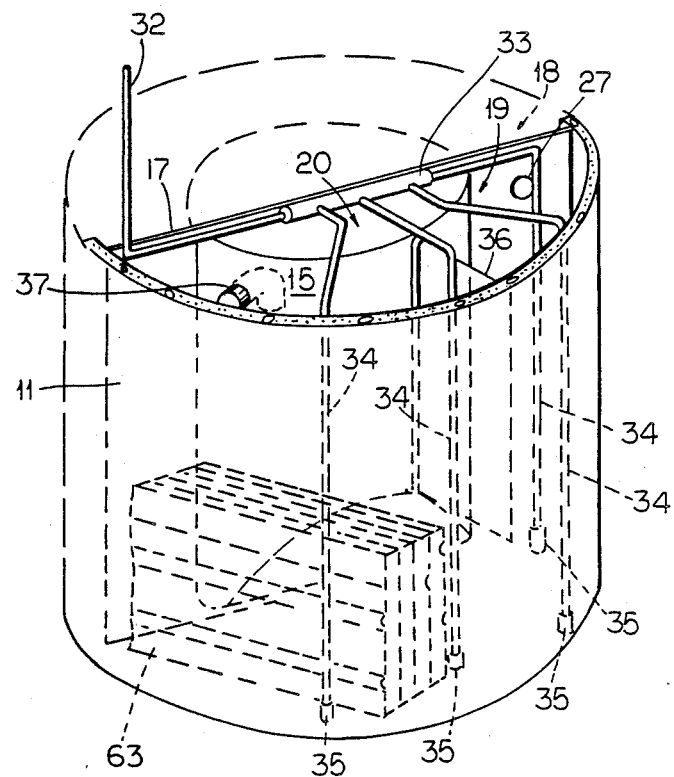
FIG. 7 is a schematic part sectioned perspective view of the aeration chamber of the assembly of FIG. 1.
Figure 10A:
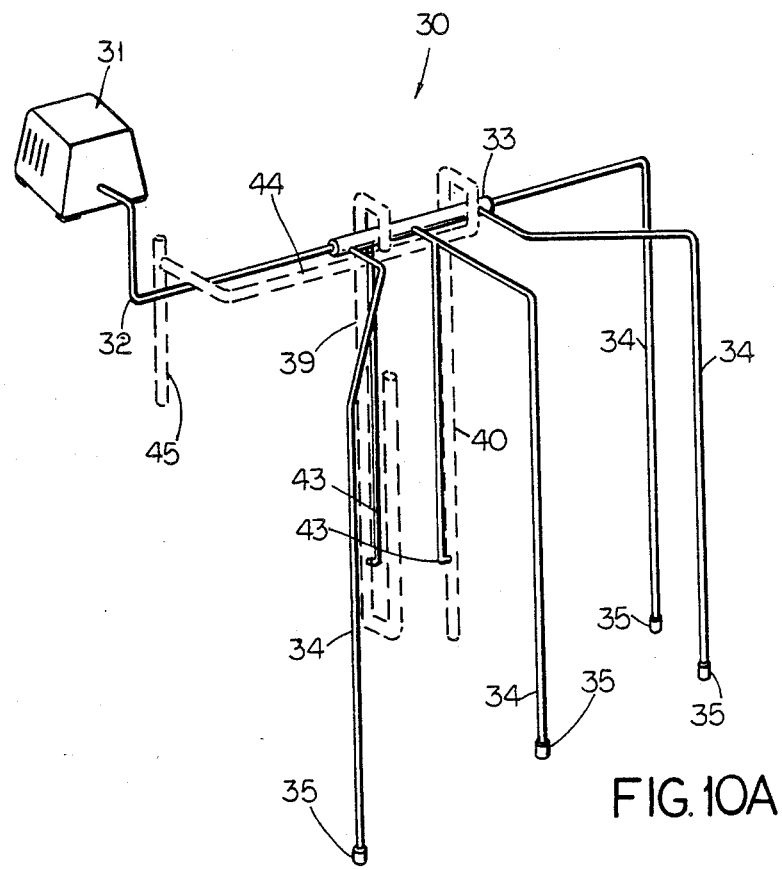
FIG. 10 is a schematic perspective view of the aeration system and solid transfer system employed in the assembly of FIG. 1.
Figure 10B:
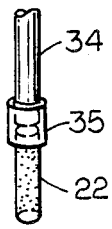

The aeration chamber 19 is more fully depicted in FIG. 7. To deliver air to the chamber 19 there is provided an aeration device 30 as best seen in FIG. 10. The aeration device 30 includes an electrically driven air pump 31 from which there extends a pressure line 32 which delivers air under pressure to a manifold 33. From the manifold there extends a plurality of conduits 34 which each terminate at their lower end with an air diffuser head 35. Air exiting from the diffuser heads 35 bubbles up through the waste water contained in the chamber 19, to aerobically treat the water contained therein. Each diffuser head 35 includes a diffuser element 22 which is a porous tube designed to transfer air via small bubbles into the water.

The chamber 19 is also provided with a sudsing baffle 36 which inhibits the flow of foam to the pipe 37 which delivers the discharge from chamber 19 to chamber 20. Preferably the chamber 19 would be provided with a block 63 of a medium to promote the growth of bacteria. The medium preferably would consist of a plurality of partitioned corrugated sheets 63.

Figure 8:
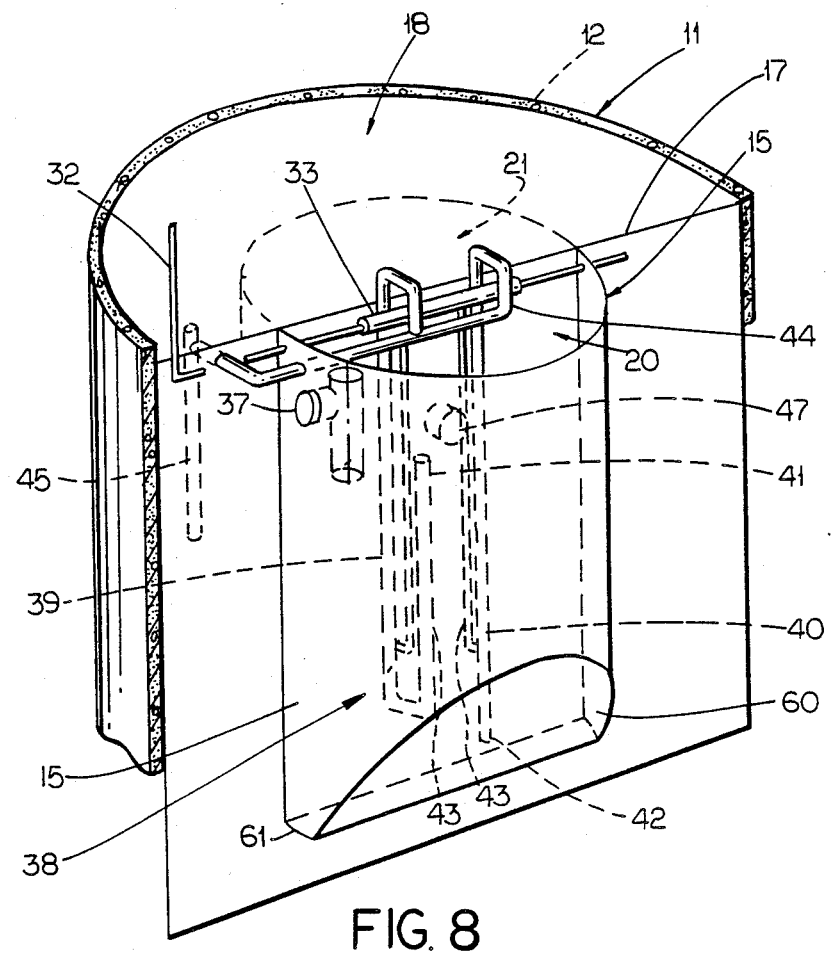
FIG. 8 is a schematic perspective view of the clarification chamber of the assembly of FIG. 1.
Figure 9:
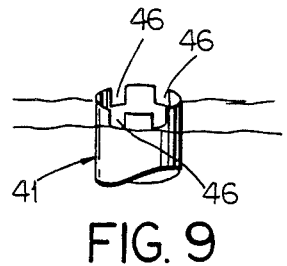
FIG. 9 is a schematic perspective view of a skimmer head employed in the clarification chamber of FIG. 8.

The discharge from chamber 19, is delivered to the chamber 20 via the pipe 37. In the chamber 20, the waste water undergoes a clarification treatment. Chamber 20 is best seen in FIG. 8. The clarification treatment includes allowing solid matter to sink and settle towards the base of the tank 15, more particularly the trench 61. The wall 60 directs solid matter toward the lower end 42 of the tube 40, which lower end 42 is located in the trench 61. Included in the chamber 20 is a conveyor assembly 63 which picks up solid matter and foam from within the chamber 20, and delivers that material to the chamber 18 for retreatment. The conveyor assembly 63 includes a pair of riser tubes 39 and 40, with the riser tube 39 terminating at its upper end 41 adjacent the upper surface of the water level within the chamber 20. The riser tubes 39 and 40 receive air via conduits 43 to cause the contents in the riser tubes 39 and 40 to pass upward to enter a manifold 44. The manifold 44 extends to a vertical pipe 45 contained in the chamber 18. The conduits 43 also communicate with the manifold 33 so as to receive air therefrom. This is best seen in FIG. 10. The upper end 41 of the tubes 39 is illustrated in FIG. 9, and includes a series of recesses 46.

Figure 11:
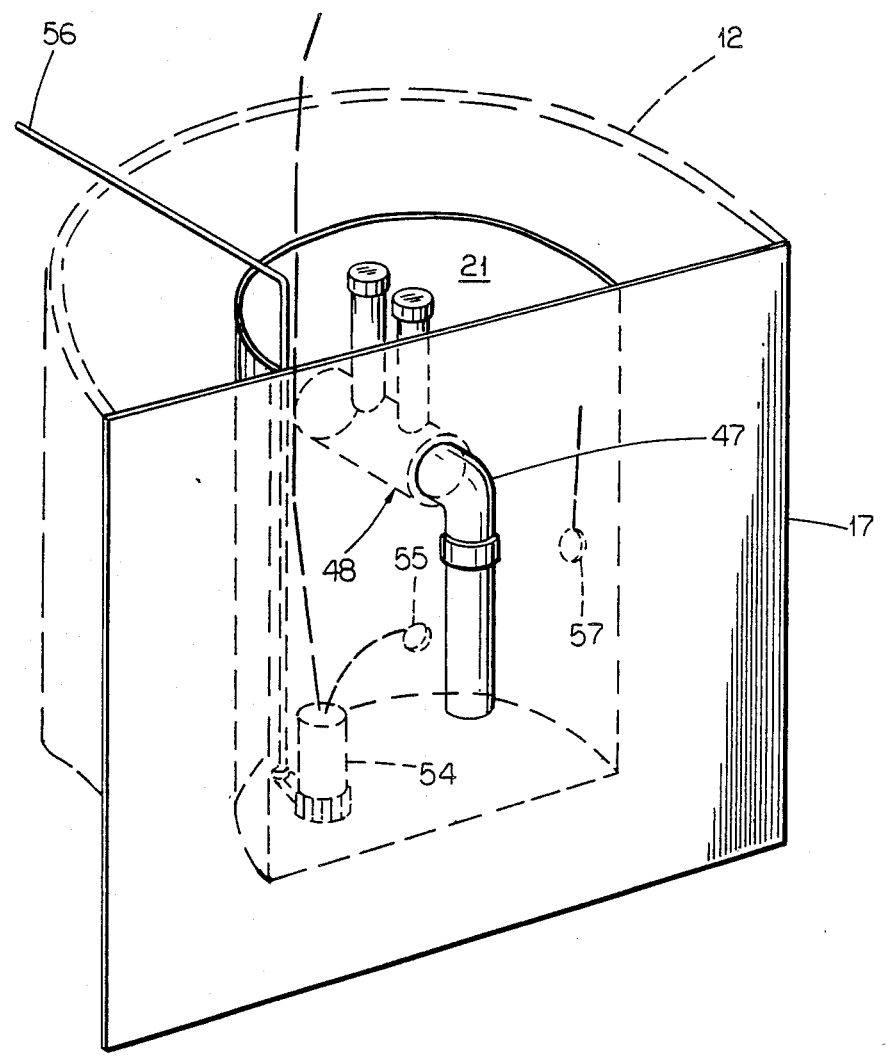
FIG. 11 is a schematic perspective view of the irrigation chamber of the assembly of FIG. 1.
Figure 12:
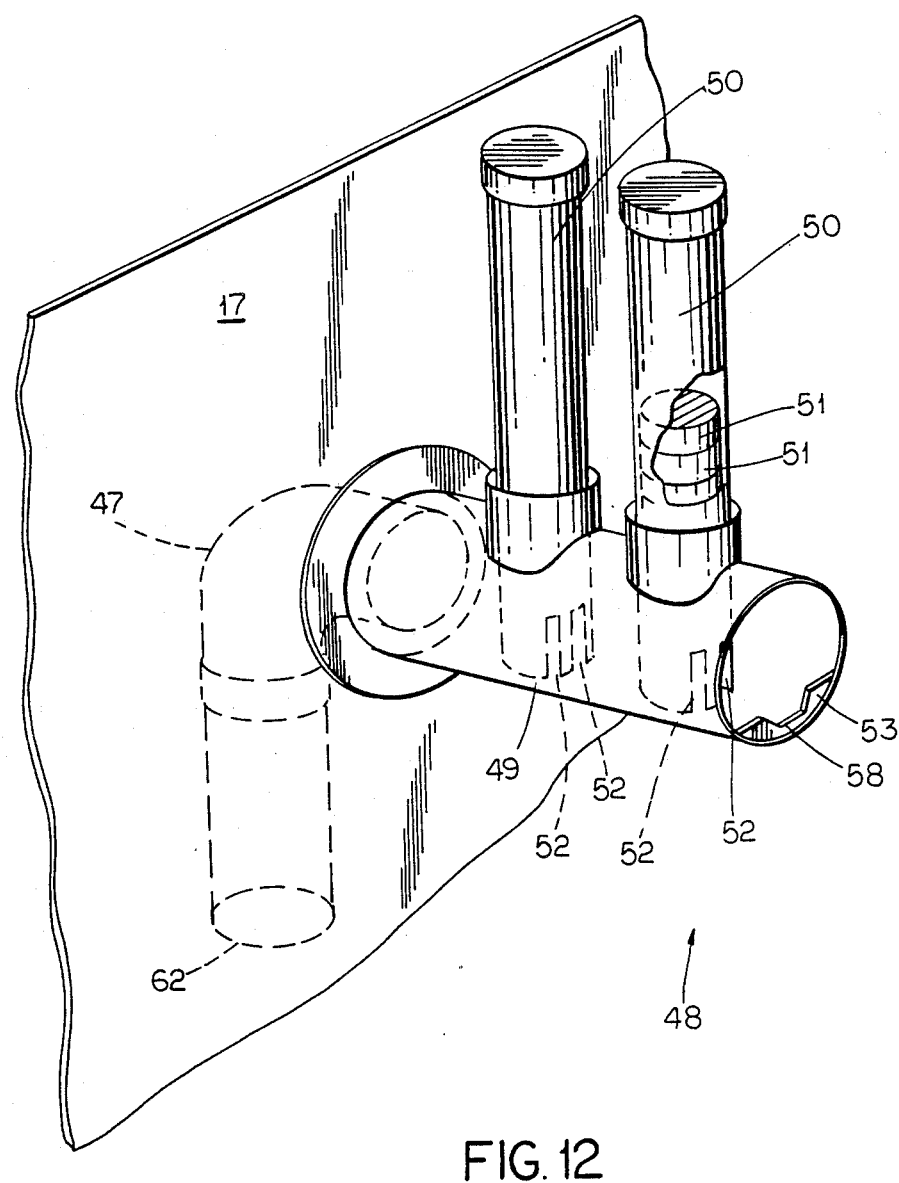
FIG. 12 is a schematic perspective view of a disinfectant dispenser employed in the irrigation chamber of FIG. 11.

The discharge from chamber 20 is delivered to chamber 21 via a pipe 47. The chamber 21 is best been in FIG. 11. The water in the chamber 21 is stored there for delivery to an irrigation system. While in the chamber 21, the water is disinfected. Preferably the water is retained in the chamber for approximately 30 minutes. The disinfection process is carried out by a chlorinator 48 as best seen in FIG. 12. The chlorinator 48 is attached to the pipe 47, having a lower opening 62, so that the discharge from the chamber 20 passes through the chlorinator before being delivered to the interior of the chamber 21. The chlorinator 48 includes a primary tube 49 from which there extends containers 50 which receive tablets of a disinfectant material 51 containing chlorine. As each of the tablets 51 reaches the bottom of the container 50, it is dissolved by the water passing through the apertures 52 in each container. As each tablet 51 is dissolved further tablets fall under the influence of gravity to a position in contact with the water flowing through the tube 49. The extremity of the tube 49 is provided with a dam 53 which maintains a certain level within the tube 49. The dam 53 has a recess 58 adapted to maintain a desired water level in the tube 49.

Contained within the chamber 21 is a pump 54 which is operated by a float 55. Extending from the pump 54 is a pipe 56 which extends to an irrigation system. Also located within the chamber 21 is a further float 57. The float 57 would operate an alarm if the water level in the chamber 21 reaches a predetermined level. This would indicate failure of the pump 54.

The air pump 31 and water pump 54 is monitored so that upon failure an alarm would be activated.

What I claim is:

1. A septic tank assembly comprising:
   a first vessel encompassing a space;
   a second vessel nested with said first vessel and co-operating therewith to divide said space into two sub-spaces;
   partition means co-operating with the two vessels to divide said sub-spaces into four treatment chambers which are generally vertically coextensive;
   an inlet duct communicating with a first one of said chambers to deliver waste water thereto for anaerobic treatment;
   a first transfer duct extending from an upper portion of said first chamber to said second chamber where the discharge from said first chamber is aerobically treated;
   a second transfer duct extending from an upper portion of said second chamber to said third chamber where the discharge of said second chamber is subjected to a clarification treatment;
   a third transfer duct extending from an upper portion of said third chamber to a fourth one of said chambers where the discharge of said third chamber is disinfected;
   an outlet duct from said fourth chamber through which treated water exits from within said assembly;
   an aeration device including an air pump and conduits to deliver air to a lower portion of said second chamber so that air passes upwardly through liquid contained within said second chamber;
   a first conveyor means extending from a lower portion of said third chamber to said first chamber to transfer solid matter from said third chamber to said first chamber;
   second conveyor means extending from an upper portion of said third chamber to said first chamber to transfer floating matter from said third chamber to said first chamber; and
   a sterilizing agent dispenser to deliver a sterilizing agent into said fourth chamber.

2. The assembly of claim 1 wherein said first vessel has a cylindrical side wall and a bottom wall, and said second vessel has a cylindrical side wall, with the cylindrical side walls being arranged coaxially, and said partition means is a portion wall extending diagonally across both tanks so as to be parallel to and extends through the longitudinal axis of the tanks.

3. The assembly of claim 2 wherein each of the conveyor means includes a vertically extending tube, and a conduit receiving air from said air pump and delivering air to a lower portion of each tube so that air rising in each tube conveys material therealong to said first chamber.

4. The septic tank of claim 2 wherein said dispenser includes a horizontal tube communicating with said third transfer duct so as to receive the discharge therefrom, and at least one vertically extending container having a lower opening communicating with the interior of the dispenser tube so that upon disinfectant material being located in said dispenser, said disinfectant material is dissolved by water passing through the dispenser tube.

5. The assembly of claim 4, wherein said dispenser tube terminates at an end aperture, with said end aperture being at least partly closed by a wall portion aiding to retain water in the dispenser tube.

* * * * *